(12) United States Patent
Sano

(10) Patent No.: US 9,747,074 B2
(45) Date of Patent: Aug. 29, 2017

(54) DIVISION CIRCUIT AND MICROPROCESSOR

(71) Applicant: Kabushiki Kaisha Toshiba, Minato-ku, Tokyo (JP)

(72) Inventor: Toru Sano, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 335 days.

(21) Appl. No.: 14/477,282

(22) Filed: Sep. 4, 2014

(65) Prior Publication Data

US 2015/0242187 A1    Aug. 27, 2015

Related U.S. Application Data

(60) Provisional application No. 61/944,350, filed on Feb. 25, 2014.

(51) Int. Cl.
*G06F 7/48* (2006.01)
*G06F 7/499* (2006.01)
*G06F 7/535* (2006.01)

(52) U.S. Cl.
CPC ........ *G06F 7/4991* (2013.01); *G06F 7/49921* (2013.01); *G06F 7/535* (2013.01)

(58) Field of Classification Search
None
See application file for complete search history.

(56) References Cited

U.S. PATENT DOCUMENTS

| | | | |
|---|---|---|---|
| 4,949,386 A | 8/1990 | Hill | |
| 5,016,210 A | 5/1991 | Sprague et al. | |
| 5,493,523 A | 2/1996 | Huffman | |
| 5,675,528 A | * 10/1997 | Matula .................... | G06F 7/535 |
| | | | 708/650 |
| 5,847,978 A | 12/1998 | Ogura et al. | |
| 6,314,443 B1 | 11/2001 | Seal | |
| 8,082,287 B2 | 12/2011 | Dockser et al. | |
| 2006/0066460 A1 | 3/2006 | Suzuki | |

* cited by examiner

*Primary Examiner* — Michael D Yaary
(74) *Attorney, Agent, or Firm* — Knobbe, Martens, Olson & Bear, LLP

(57) ABSTRACT

In an embodiment, a division circuit has an overflow determination circuit configured to determine whether or not a division result overflows by comparing absolute values of a dividend and a divisor, a replacement circuit configured to replace the dividend with a first value and replace the divisor with a second value when the overflow determination circuit determines that the division result overflows, and a stepwise division circuit configured to perform stepwise division on the dividend and the divisor or the first value and the second value.

17 Claims, 10 Drawing Sheets

```
DIVS REX R1
DIVQ REX R1
DIVQ REX R1
DIVQ REX R1
DIVQ REX R1
DIVQ REX R1
DIVQ REX R1
DIVQ REX R1
```

FIG.7

```
if(Rd[15]=Rs[7]){    //      When quotient is positive
        tmp=Rd-(Rs<< 8);      // Comparison operation for quotient overflow determination
        if(Rd[15]=tmp[15]){   //      |Dividend| >= |Divisor|
                //    After execution of DIVQ 7 times, rewrite Rd, Rs so that Rd, Rs ≒ 1.0
                Rd=(0x7F)<< 8;
                Rs=(0x7F);
        }
}else{   //           When quotient is negative
        tmp=Rd+(Rs<< 8);
        if(Rd[15]=tmp[15]){
                Rd=(0x81)<< 8;
                Rs=(0x7F);
        }
}
Rd=(Rd[14:0]) | (Rd[15] xor Rs[7]); // Store dividend without sign and sign of quotient
```

FIG.8

```
if(pre_inst="DIVS"){   // Instruction last executed, and
                      // Switch between addition and subtraction according to
                      immediately preceding operation result (sign of quotient)
  if(Rd[0]==0){
    tmp=Rd-(Rs<< 8);
  }else{
    tmp=Rd+(Rs<< 8);
  }
}else{
  if(Rd[0]==1){
    tmp=Rd-(Rs<< 8);
  }else{
    tmp=Rd+(Rs<< 8);
  }
}
Rd=Rd[14:0]) | (Rd[15] xor Rs[7];   // Write obtained quotient one bit and partial remainder
```

FIG.9

```
                    REX                 R1
                    0x2C28(=0.345)      0x48(=0.567)
DIVS  REX  R1       0x5850
DIVQ  REX  R1       0x20A1
DIVQ  REX  R1       0xB142
DIVQ  REX  R1       0xF284
DIVQ  REX  R1       0x7509
DIVQ  REX  R1       0x5A13
DIVQ  REX  R1       0x2427
DIVQ  REX  R1       0xB84E
                      (0x4E=0.609375)
```

FIG.10

```
                    REX                 R1
                    0x4892(=0.567)      0x2C(=0.345)
DIVS  REX  R1       0x7F00              0x7F
DIVQ  REX  R1       0xFE00
DIVQ  REX  R1       0xFE01
DIVQ  REX  R1       0xFE03
DIVQ  REX  R1       0xFE07
DIVQ  REX  R1       0xFE0F
DIVQ  REX  R1       0xFE1F
DIVQ  REX  R1       0xFE3F
DIVQ  REX  R1       0xFE7F
                      (0x7F=0.992188)
```

DIVISION CIRCUIT AND MICROPROCESSOR

FIELD

Embodiments described herein relate generally to a division circuit and a microprocessor.

BACKGROUND

Division circuits are included in various arithmetic units and find widespread application. In division circuits, division is performed by inputting a dividend and a divisor and there is a possibility of overflowing of the quotient value of the division result.

An arithmetic unit is known which is designed to cope with such quotient value overflowing, which has a saturation operation function, and which, when the value of a quotient overflows, outputs a maximum value determined in advance in place of the value of the quotient obtained by the operation.

Before execution of division of a dividend by a divisor, determination as to whether or not the value of the quotient overflows can be made from the dividend and the divisor.

In the case of stepwise division executed by repeating an addition/subtraction step, however, there is a need to hold, in a storage circuit such as a register, till the completion of the stepwise division, information on a determination result obtained before execution of the division and indicating that the value of a quotient overflows.

In general, if information indicating that the value of a quotient overflows is held in a storage circuit such as a register, the circuit configuration of the division circuit is complicated and the circuit area is considerably increased.

BRIEF DESCRIPTION OF THE DRAWINGS

FIG. 7 is a diagram showing an example of an operation detail pseudo-code of a DIVS instruction in the embodiment;

FIG. 8 is a diagram showing an example of an operation detail pseudo-code of a DIVQ instruction in the embodiment;

FIG. 9 is a diagram showing changes in register value when no overflow occurs during execution of the stepwise division instruction;

FIG. 10 is a diagram showing changes in register value when an overflow occurs during execution of the stepwise division instruction;

DETAILED DESCRIPTION

A division circuit in an embodiment has an overflow determination circuit configured to determine whether or not a division result overflows by comparing absolute values of a dividend and a divisor, a replacement circuit configured to replace the dividend with a first value and replace the divisor with a second value when it is determined that the division result overflows, and a stepwise division circuit configured to perform stepwise division on the dividend and the divisor or the first value and the second value.

(Configuration)

Figure 1:
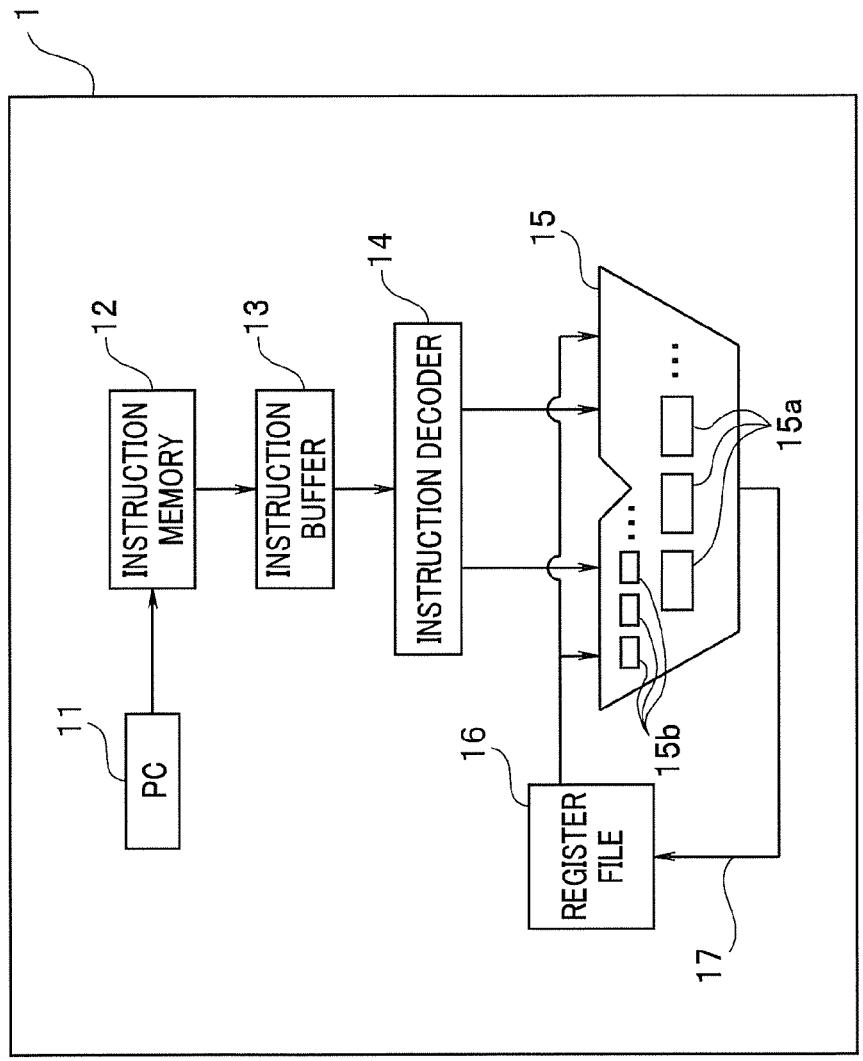
FIG. 1 is a block diagram schematically showing the configuration of a microprocessor according to an embodiment.

FIG. 1 is a block diagram schematically showing the configuration of a microprocessor according to the embodiment. A microprocessor (hereinafter referred to as "processor") 1 executes an operation based on an instruction inputted through an input interface circuit not illustrated, and outputs an execution result to the outside through an output interface circuit not illustrated. The processor 1 includes a central processing unit (CPU), a ROM and a RAM, and executes a designated program. The processor 1 is incorporated in computers, image processing devices, various control devices, etc.

Description will be made below of a case where a division instruction is inputted to the processor 1 to execute stepwise division. FIG. 1 shows a case where a least number of components are incorporated in a typical processor. In FIG. 1, only sections relating to the division circuit according to the present embodiment are illustrated, while illustration of sections not relating to the division circuit is omitted.

The processor 1 includes a program counter (PC) 11, an instruction memory 12, an instruction buffer 13, an instruction decoder 14, an arithmetic logic unit (hereinafter referred to as "ALU") 15, and a register file 16.

The program counter 11 is a register configured to store addresses for instructions to be executed. The instruction memory 12 is configured to hold a sequence of instructions. The instruction memory 12 is a ROM, RAM, or the like.

The instruction buffer 13 is a register configured to temporarily store an instruction to be executed. An instruction read out from the instruction memory 12 according to an address indicated by the program counter 11 is stored in the instruction buffer 13.

The instruction decoder 14 decodes information from the instruction buffer 13 and extracts, in accordance with an instruction format, a register number read out from the register file 16. Further, the instruction decoder 14 determines which of the various circuits for logical operations or arithmetic operations in the ALU 15 is to be used, and generates and outputs a control signal F (see FIG. 4) that activates the circuit to be used.

The ALU 15 is a circuit configured to execute instructions. The ALU 15 includes a group of circuits including an adder/subtractor 15a and a multiplexer 15b for various kinds of operation. In the ALU 15, components including a functional unit necessary for executing an instruction are selected according to corresponding control signals F (see FIG. 4).

The register file 16 is a group of registers in which data necessary for operations is stored. An operation result from the ALU 15 is written back to the register file 16 via a register write value signal line 17 for writing data to the register file 16.

Thus, the processor 1 executes a program according to the program counter 11. Execution of various instructions is performed in the arithmetic processing unit 15. Execution results are stored in the register file 16.

It is assumed that, in an example described below, a dividend is of 16 bits; a divisor is of 8 bits; a quotient is of 8 bits (=16·8); and each number is expressed as a fixed-point number with a sign.

Figures 2, 3:
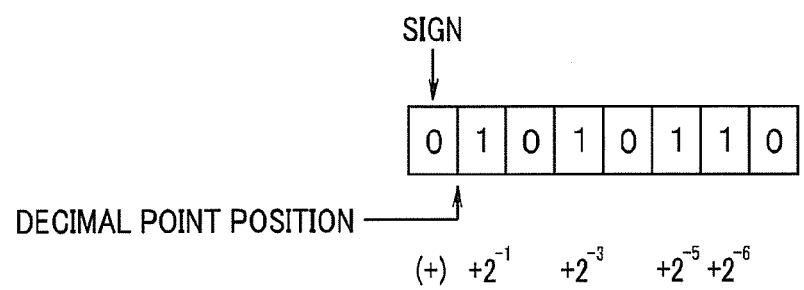
FIG. 2 is a diagram for explaining Q number representation.
FIG. 3 is a diagram showing an example of a stepwise division instruction in the embodiment.

FIG. 2 is a diagram for explaining Q number representation. In the present embodiment, a fixed-point number is expressed in Q format; a dividend is expressed in Q15; and a divisor and a quotient are expressed in Q7. Figures in Q format indicate the position of a decimal point from the LSB (least significant bit). For example, in the case of Q7, a decimal point position such as shown in FIG. 2 is assumed. In the example shown in FIG. 2, "0.6789" is expressed. Note that the value of the MSB (most significant bit) represents a sign, 0 representing a positive, 1 representing a negative.

FIG. 3 is a diagram showing an example of a stepwise division instruction in the present embodiment. The operation in a case where the sequence of instructions shown in FIG. 3 is stored in the instruction memory 12 and the sequence of instructions read out is executed will be described below. It is assumed that a dividend Rd is stored in a REX register in the register file 16 and a divisor Rs is stored in an R1 register. A dividend in a case where the quotient of A/B is obtained is assumed to be Rd(A), and a divisor in this case, to be Rs(B). A case where division is performed by using Rd(A) as a source operand dividend and using Rs(B) as a source operand divisor will be described.

In a case where an 8-bit quotient is obtained, a DIVS instruction is first executed one time and a DIVQ instruction is executed seven times, thereby obtaining an 8-bit quotient including a sign 1 bit.

Figure 4:
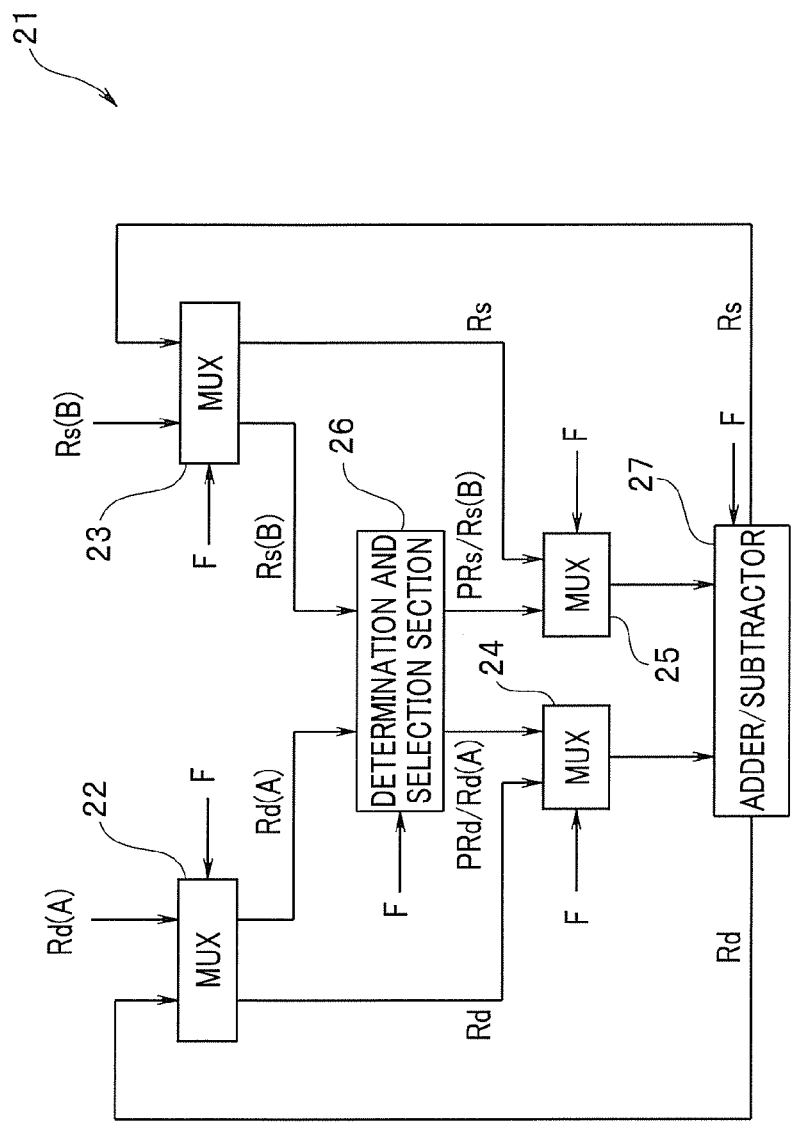
FIG. 4 is a block diagram of a configuration of a division circuit 21 in which stepwise division in the embodiment is executed.

FIG. 4 is a block diagram of a division circuit 21 in which stepwise division in the present embodiment is executed. The division circuit 21 is formed by circuits in the ALU 15. The division circuit 21 includes multiplexers 22, 23, 24, and 25, a determination and selection section 26, and an adder/subtractor 27.

Circuits used by a stepwise division instruction are selected and activated by control instructions F according to the instruction to be executed. Further, when the stepwise division instruction is executed, the group of circuits corresponding to the stepwise division instruction is selected and activated by control instructions F, and register numbers in the register file 16 are also designated.

Two values Rd are inputted to the multiplexer 22, and an input designated by a control instruction F is selected and outputted. One of the two values Rd is an initial dividend Rd(A), and the other is an output value from the adder/subtractor 27 (i.e., an output value from the adder/subtractor 27 in the course of stepwise division).

Two values Rs are inputted to the multiplexer 23, and an input designated by a control instruction F is selected and outputted. One of the two values Rs is an initial divisor Rs(B), and the other is an output value from the adder/subtractor 27 (i.e., an output value from the adder/subtractor 27 in the course of stepwise division).

The output from the multiplexer 22 is connected to the multiplexer 24 and the determination and selection section 26. When the dividend Rd(A) is inputted, the multiplexer 22 operates so as to supply the dividend Rd(A) to the determination and selection section 26.

The output from the multiplexer 23 is connected to the multiplexer 25 and the determination and selection section 26. When the divisor Rs(B) is inputted, the multiplexer 23 operates so as to supply the divisor Rs(B) to the determination and selection section 26.

After an operation result is outputted from the adder/subtractor 27, the DIVS instruction is executed and the multiplexer 22 selects the output value Rd from the adder/subtractor 27 and outputs the selected value to the multiplexer 24. Similarly, after an operation result is outputted from the adder/subtractor 27, the DIVS instruction is executed and the multiplexer 23 selects the output value Rs from the adder/subtractor 27 and outputs the selected value to the multiplexer 25.

The determination and selection section 26 performs a predetermined determination operation by using the inputted dividend Rd(A) and divisor Rs(B). The determination and selection section 26 outputs the dividend Rd(A) or a predetermined dividend PRd to the multiplexer 24 according to a determination operation result. The determination and selection section 26 outputs the divisor Rs(B) or a predetermined divisor PRs to the multiplexer 25 according to the determination operation result.

The output from the multiplexer 22 and the output from the determination and selection section 26 are inputted to the multiplexer 24, and the input designated by a control instruction F is selected and outputted. When the DIVS instruction is executed, the multiplexer 24 selects the output value Rd from the multiplexer 22 and outputs the selected value to the adder/subtractor 27. The output from the multiplexer 23 and the output from the determination and selection section 26 are inputted to the multiplexer 25, and the input designated by a control instruction F is selected and outputted. When the DIVS instruction is executed, the multiplexer 25 selects the output value Rs from the multiplexer 23 and outputs the selected value to the adder/subtractor 27.

The outputs from the multiplexers 24 and 25 are inputted to the adder/subtractor 27. The adder/subtractor 27 executes one instruction for stepwise division. The adder/subtractor 27 executes stepwise division by supplying, as operation results, the output value Rd to the multiplexer 22, and the output value Rs to the multiplexer 23. That is, the adder/subtractor 27 constitutes a stepwise division circuit in which stepwise division using the dividend Rd(A) and the divisor Rs(B) is performed.

Note that, while the output values Rd and Rs from the adder/subtractor 27 are respectively inputted directly to the multiplexers 22 and 23 in this example, the output values Rd and Rs may alternatively be stored temporarily in the register file 16. The multiplexers 22 and 23 may read out, from the register file 16, the output values Rd and Rs from the adder/subtractor 27.

In the operation according to the DIVS instruction, in the present embodiment, determination as to the sign of the quotient obtained from the dividend Rd(A) and the divisor Rs(B) and determination as to the magnitude relationship between the dividend Rd(A) and the divisor Rs(B) are made and, if overflowing occurs, rewriting of the dividend Rd(A) and the divisor Rs(B) is performed. The values as a result of this rewriting are the predetermined dividend PRd corresponding to the dividend Rd(A) and the predetermined divisor PRs corresponding to the divisor Rs(B). The PRd and PRs are a dividend and a divisor such that the quotient obtained by executing the DIVQ instruction a specified number of times is a saturated value. Thus, the adder/ subtractor 27 performs stepwise division on the dividend Rd(A) and the divisor Rs(B) or the predetermined dividend PRd and divisor PRs.

Figure 5:
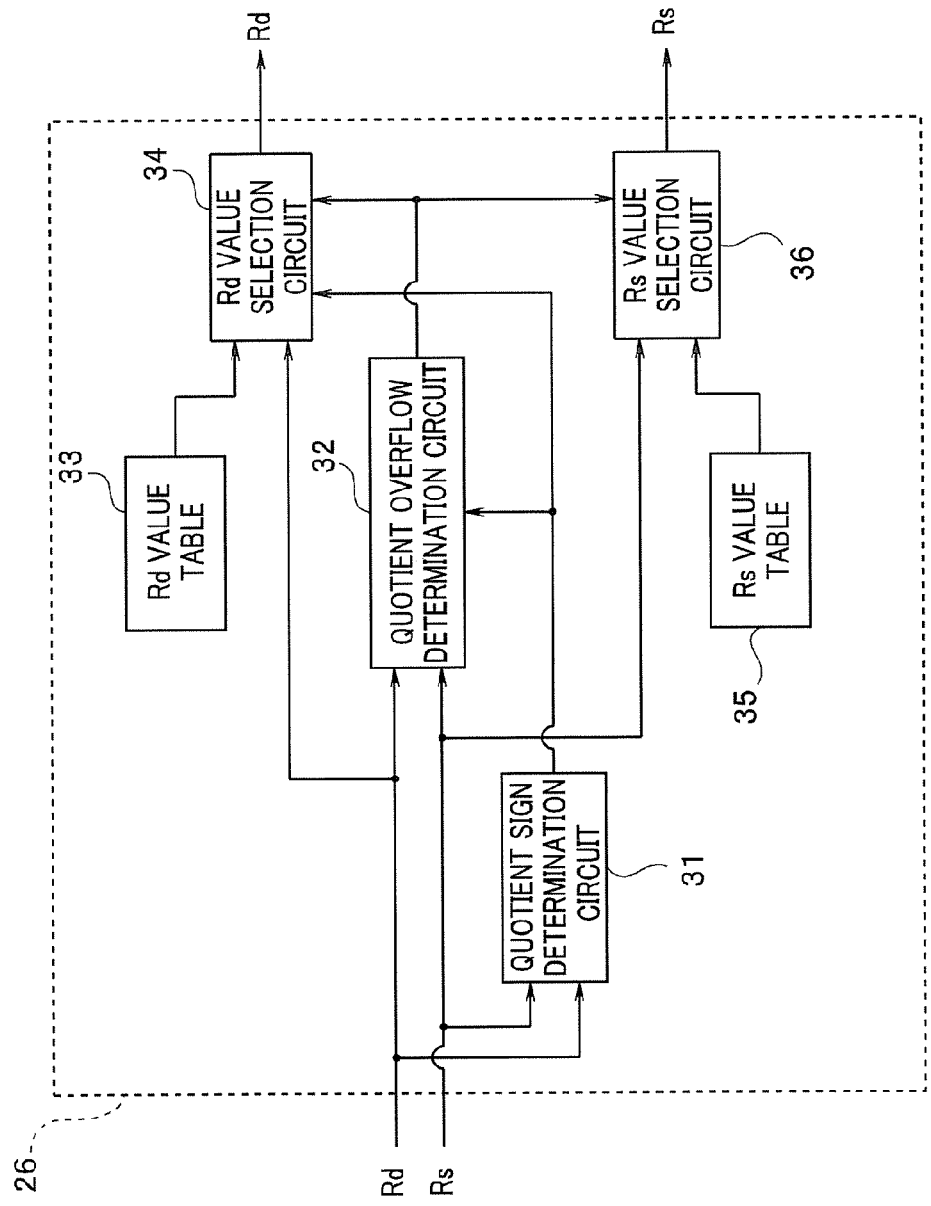
FIG. 5 is a block diagram showing an example of the configuration of a determination and selection section 26 according to the embodiment.
Figure 6:
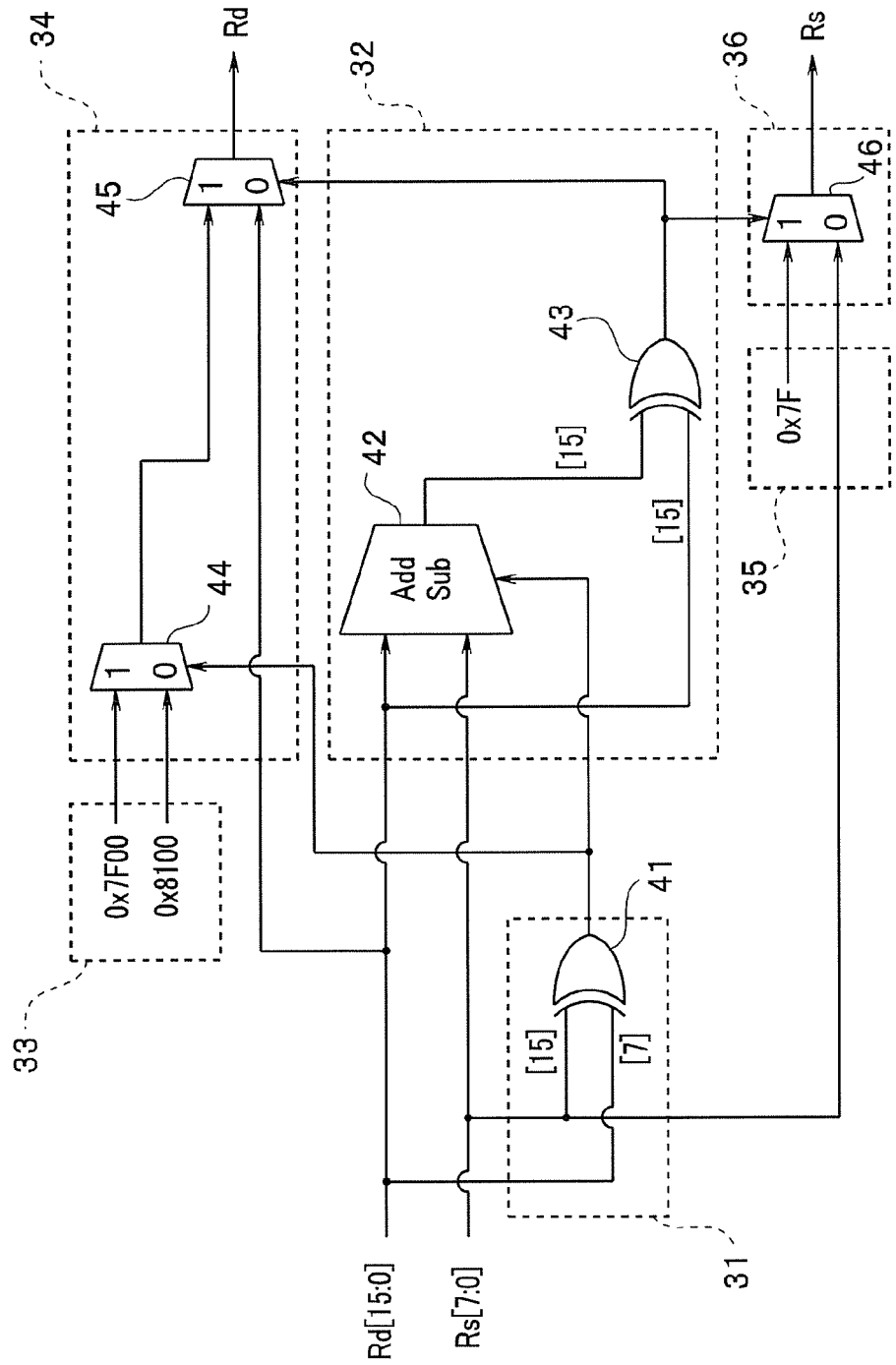
FIG. 6 is a circuit diagram showing an example of the circuit configuration of the determination and selection section 26 according to the embodiment.

FIG. 5 is a block diagram showing an example of the configuration of the determination and selection section 26 according to the present embodiment. FIG. 6 is a circuit diagram showing an example of the circuit configuration of the determination and selection section 26 according to the present embodiment.

The determination and selection section 26 shown in FIG. 5 includes a quotient sign determination circuit 31, a quotient overflow determination circuit 32, an Rd value table 33, which is a storage device storing the predetermined dividend PRd, an Rd value selection circuit 34, an Rs value table 35, which is a storage device storing the predetermined divisor PRs, and an Rs value selection circuit 36.

The quotient sign determination circuit 31 determines the sign of the quotient obtained by division using the dividend Rd(A) and the divisor Rs(B). As shown in FIG. 6, the quotient sign determination circuit 31 is a circuit 41 configured to perform exclusive disjunction (or exclusive OR) between the MSBs: the most significant code bits of the dividend Rd(A) and the divisor Rs(B).

The quotient overflow determination circuit 32 makes quotient overflow determination. That is, the quotient overflow determination circuit 32 compares the absolute values of the dividend Rd(A) and the divisor Rs(B) and determines whether or not the division result overflows. If the quotient overflow condition (|Rd(A)|≥|Rs(B)|) is satisfied, it is determined that the division result overflows.

The quotient overflow determination circuit 32 outputs a register rewrite validity signal RsWe according to the determination result. The quotient overflow determination circuit 32 includes, as shown in FIG. 6, an adder/subtractor 42 and an exclusive logical disjunction (XOR) circuit 43. The adder/subtractor 42 changes the operation according to the result of determination made by the quotient sign determination circuit 31, and performs an operation to compare the magnitudes of the dividend Rd(A) and the divisor Rd(B). The exclusive logical disjunction circuit 43 outputs the exclusive disjunction between the operation result from the adder/subtractor 42 and the dividend Rd(A) as register rewrite validity signal RsWe.

The register rewrite validity signal RsWe is a signal indicating whether or not the register value corresponding to the divisor Rs in the register file 16 is to be updated. The divisor Rs is a value which does not need to be rewritten if the quotient does not overflow. Note that rewriting of the dividend Rd occurs irrespective of whether or not an overflow occurs. If no overflow occurs, the operation result including the sign of the quotient is updated. If an overflow occurs, the value in the Rd value table 33 is updated. Details of processing for updating the dividend Rd and the divisor Rs will be described later with reference to FIG. 7.

When the quotient overflow condition in the quotient overflow determination circuit 32 is satisfied, the Rd value selection circuit 34 replaces the dividend Rd(A) with the predetermined dividend PRd and outputs the predetermined dividend PRd. The Rd value selection circuit 34 includes two multiplexers 44 and 45, as shown in FIG. 6.

The multiplexer 44 selects the predetermined dividend PRd from the Rd value table 33 according to the result of determination made by the quotient sign determination circuit 31, and outputs the predetermined dividend PRd to the multiplexer 45. The multiplexer 45 is a selection circuit which selects the dividend Rd(A) or the predetermined dividend PRd according to the result of determination made by the overflow determination circuit 32 and outputs the selected dividend as output value Rd.

Thus, the Rd value selection circuit 34 outputs the dividend Rd(A) without changing the dividend Rd(A) if the quotient does not overflow, and selects and outputs the predetermined dividend PRd with one of the positive and negative signs in the Rd value table 33 when it is determined that the quotient overflows.

The Rd value table 33 holds as the predetermined dividend PRd a dividend PRd (=0x7F00) for a positive maximum of the quotient and a dividend PRd (=0x8100) for a negative maximum of the quotient.

The Rs value selection circuit 36 selects and outputs the predetermined divisor PRs for the saturated value of the quotient from the Rs value table 35 if the quotient overflow condition in the quotient overflow determination circuit 32 is satisfied. The Rs value selection circuit 36 includes a multiplexer 46, as shown in FIG. 6.

The multiplexer 46 is a selection circuit which selects the divisor Rs(B) or the predetermined divisor PRs according to the result of determination made by the overflow determination circuit 32 and outputs the selected dividend as output value Rs.

The Rs value selection circuit 36 outputs the divisor Rs(B) without changing the divisor Rs(B) if the quotient does not overflow, and outputs the predetermined divisor PRs in the Rs value table 35 when it is determined that the quotient overflows.

The Rs value table 35 holds as the predetermined divisor PRs a divisor (=0x7F) for a maximum of the quotient (irrespective of whether positive or negative).

That is, the Rd value selection circuit 34 and the Rs value selection circuit 36 are respectively a replacement circuit configured to replace the dividend Rd(A) with the first value PRd when it is determined in the overflow determination circuit 32 that the division result overflows and a replacement circuit configured to replace the divisor Rs(B) with the second value PRs when the same determination is made.

FIG. 7 is a diagram showing an example of an operation detail pseudo-code of the DIVS instruction in the present embodiment. FIG. 8 is a diagram showing an example of an operation detail pseudo-code of the DIVQ instruction. In the present embodiment, the DIVS instruction and the DIVQ instruction are instructions for executing stepwise division, for example, based on a non-restoring division method. Each instruction is executed for the operation according to the pseudo-code shown in FIG. 7 or 8 in the ALU 15.

Referring to FIG. 7, for example, the first and eighth lines correspond to processing performed by the quotient sign determination circuit 31; the second and third lines correspond to processing performed by the quotient overflow determination circuit 32; the fifth and eleventh lines correspond to processing performed by the Rd value selection circuit 34; the sixth and twelfth lines correspond to processing performed by the Rs value selection circuit 36; and the fifteenth line corresponds to processing for storing the quotient sign.

FIG. 8 shows the operation according to the DIVQ instruction. Additions/subtractions in the fourth, sixth, ninth, and twelfth lines are assumed to be shared with the DIVS instruction in the adder/subtractor 27. Note that switch between addition and subtraction is made according to whether the instruction last executed is the DIVS instruction or the DIVQ instruction. Further, in the sequence of the DIVQ instruction, switch is made according to the result of the operation last executed. Note that details of the operation according to the DIVQ instruction are not changed even in implementation of the present proposition.

(Function)

A concrete example of operations will be described.

(When No Overflow Occurs)

FIG. 9 is a diagram showing changes in register value when no overflow occurs during execution of the stepwise division instruction. FIG. 9 shows a case of obtaining A/B where A=0.345 and B=0.567.

When the DIVS instruction is first executed, the overflow determination result is false (that is, no overflow occurs) and, therefore, the Rd value selection circuit 34 and the Rs value selection circuit 36 are not activated.

Accordingly, the determination and selection section 26 outputs the inputted dividend Rd(A) and divisor Rs(B) to the multiplexers 24 and 25, respectively, and the predetermined addition/subtraction is executed in the adder/subtractor 27. The adder/subtractor 27 outputs the dividend Rd and the divisor Rs as results of execution of the addition/subtraction to the multiplexers 22 and 23, respectively. Thereafter, the DIVQ instruction is executed seven times based on the outputted dividend Rd and divisor Rs.

After the DIVQ instruction is executed seven times, the 8-bit quotient as a result of the operation is stored in the less significant 8 bits in the register REX, thereby obtaining the desired quotient 0x4E=0.609375 (with an error smaller than the lowest accuracy $2^{-7}$=0.007813 of Q8).

(When Overflow Occurs)

FIG. 10 is a diagram showing changes in register value when an overflow occurs during execution of the stepwise division instruction. FIG. 10 shows a case of obtaining A/B where A=0.567 and B=0.345. In this case, the quotient is expected to be 1.643 . . . , but this value exceeds the maximum in Q8 format and the quotient overflows.

At the time of execution of the DIVS instruction in this case, the quotient sign determination circuit 31 determines that the quotient is positive and the quotient overflow determination circuit 32 determines that the quotient overflows. The Rd value selection circuit 34 and the Rs value selection circuit 36 are activated according to the results of determination in the quotient sign determination circuit 31 and the quotient overflow determination circuit 32, and rewrite the values in the registers REX and R1 into PRd=0x7F00(=0.992188) and PRs=0x7F(=0.992188).

More specifically, the determination and selection section 26 outputs the predetermined dividend PRd and the predetermined divisor PRs in place of the inputted dividend Rd(A) and divisor Rs(B) to the multiplexers 24 and 25, respectively. The adder/subtractor 27 outputs the output values Rd and Rs as results of execution of the addition/subtraction to the multiplexers 22 and 23, respectively. Thereafter, the DIVS instruction is executed and the DIVQ instruction is executed seven times.

Final results of execution of the stepwise division are REX=0xFE7F and the quotient 0.992188. This is saturation to the positive maximum in Q8 (≈1).

The above-described embodiment is an example of obtaining an 8-bit quotient. However, the embodiment can also be applied to division in the case of obtaining, for example, a 32-bit quotient, by only changing the values in the Rd value table 33 and the Rs value table 35.

The present embodiment can also be applied to division of an integer and, if the arithmetic unit has some other pipeline structure, to a kind of stepwise division different from that described above as well as to division of a fixed point number, provided that overflow determination can be made before operation and source operand rewriting can be performed.

Modifications of the present embodiment will be described below. In following description of the modifications, the same components as those in the above-described embodiment are indicated by the same reference characters and the descriptions thereof will not be repeated. Description will be made only of different components.

(Modification 1)

In Modification 1, the Rd value table 33 and the Rs value table 35 are formed by rewritable circuits.

Figure 11:
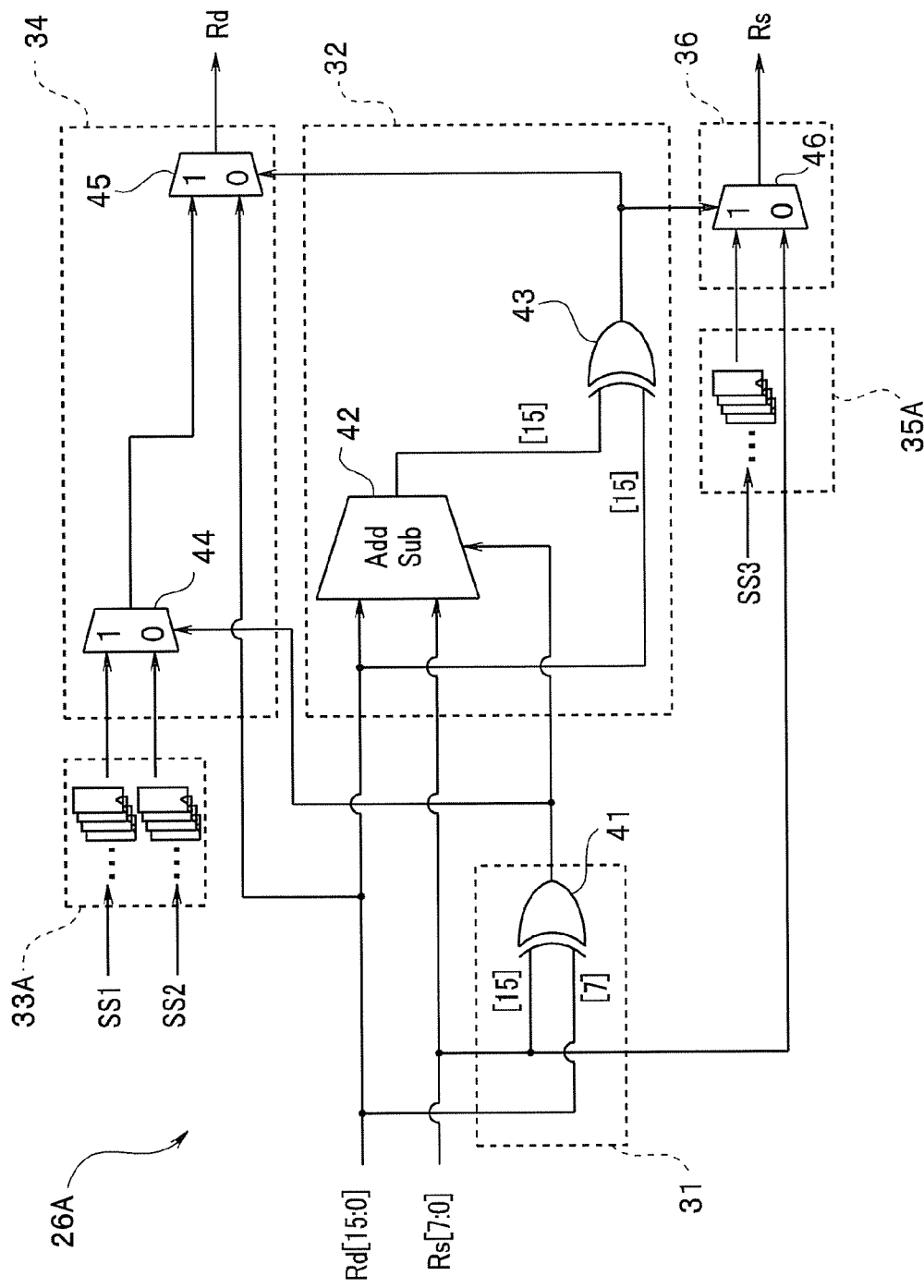
FIG. 11 is a circuit diagram showing an example of the circuit configuration of a determination and selection section 26A according to Modification 1 of the embodiment.

FIG. 11 is a circuit diagram showing an example of the circuit configuration of a determination and selection section 26A according to Modification 1. An Rd value table 33A and an Rs value table 35A are storage devices in which data can be rewritten from outside the processor 1.

Further, a plurality of values can be set in each of the Rd value table 33 and the Rs value table 35. For example, in the case of Q8, a predetermined dividend PRd1 and a predetermined divisor PRs1 can be selected. In the case of Q15, a predetermined dividend PRd2 and a predetermined divisor PRs2 can be selected. That is, the determination and selection section 26A can change the predetermined dividend PRd and the predetermined divisor PRs according to the Q number of the values in the division.

Referring to FIG. 11, two selection signals SS1 and SS2 are inputted to the Rd value table 33A, a selection is made according to the Q number from the predetermined dividends PRd1 and PRd2 with respect to a case where the quotient is positive or a case where the quotient is negative, and the selected dividend is outputted. A selection signal SS3 is inputted to the Rs value table 35A and the predetermined divisor PRs1 is selected and outputted. The selection signals SS1 to SS3 are externally given.

When an overflow occurs, the dividend PRd and the divisor PRs for the quotient 0 can be set in the Rd value table 33A and the Rs value table 35A, respectively.

Note that data on predetermined dividend values PRd and divisor values PRs may be set by being stored or overwritten on the register file 16 to be respectively used as data in the Rd value table 33A and data in the Rs value table 35A.

(Modification 2)

In Modification 2, when division by zero is detected by detecting the divisor Rs being zero, rewriting of the dividend Rd(A) and the divisor Rs(B) is performed.

Figure 12:
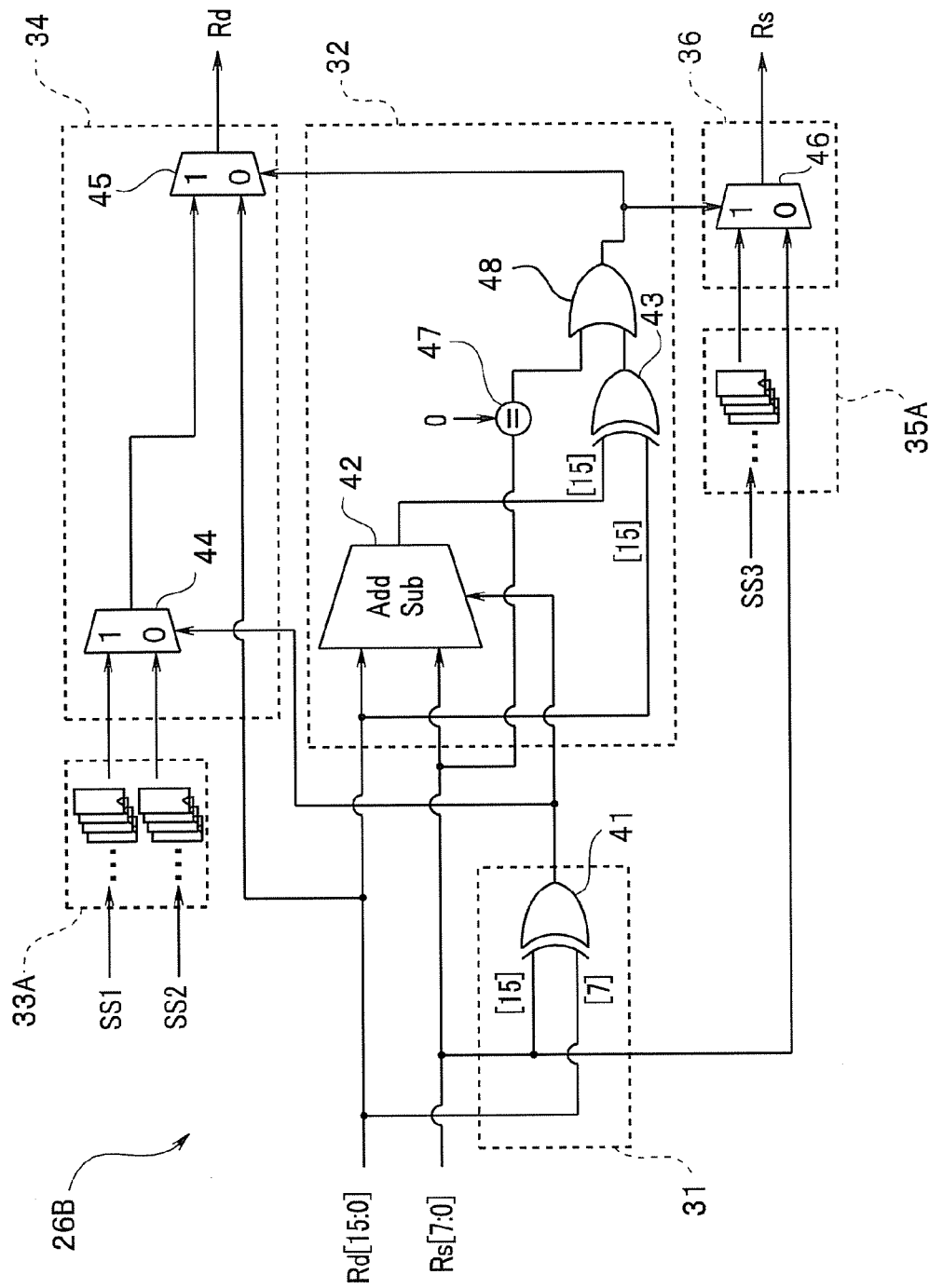
FIG. 12 is a circuit diagram showing an example of the circuit configuration of a determination and selection section 26B according to Modification 2 of the embodiment.

FIG. 12 is a circuit diagram showing an example of the circuit configuration of a determination and selection section 26B according to Modification 2. The determination and selection section 26B has a determination circuit 47 configured to determine whether or not the divisor Rs(B) is zero. An output from the determination circuit 47, which is a zero determination circuit, is connected to one of two input terminals of a logical disjunction (OR) circuit 48. The output from the exclusive logical disjunction circuit 43 is connected to the other input terminal of the logical disjunction circuit 48.

Accordingly, when the divisor Rs(B) is zero, the output from the determination circuit 47 is high (H) and the output from the logical disjunction circuit 48 is also high (H). As a result, the multiplexers 45 and 46 select and output outputs from the Rd value table 33A and the Rs value table 35A.

Thus, in Modification 2, determination is made as to whether or not the value of the divisor Rs is zero and rewriting of the dividend Rd(A) and the divisor Rs(B) is also performed when the value of the divisor Rs is zero. In other respects, the operation is the same as that in Modification 1.

Thus, in Modification 2, exceptional processing with respect to the quotient in the case of division by zero can be performed.

Note that in FIG. 12, the determination circuit 47 and the logical disjunction circuit 48 are added to the circuit in Modification 1. However, the determination circuit 47 and the logical disjunction circuit 48 may also be added to the circuit in the embodiment shown in FIG. 6.

In the present embodiment and in each modification, a division circuit in which the circuit configuration for stepwise division can be simplified, whose circuit area can be reduced, and which has a saturation operation function and a microprocessor including the division circuit can be provided.

Also, in the present embodiment and in each modification, the saturation operation is realized by means of hardware. In the present embodiment and in each modification, therefore, the need for devising a piece of software for outputting, in the event of overflowing of the value of a quotient, after execution of division, a predetermined maximum value in place of a quotient value obtained by the operation, as in the case of the conventional art can be eliminated. The number of cycles of execution of the division instruction and the instruction code size can thereby be reduced.

Note that, while the division circuit in each of the present embodiment and the modifications is applied to the ALU for ordinary processors, the division circuit can also be applied to control sections for various kinds of control including motor control. For example, in motor control, the division circuit is useful in satisfying the need to saturate the operation result and clip the output at a predetermined value.

While certain embodiments have been described, these embodiments have been presented by way of example only, and are not intended to limit the scope of the inventions. Indeed, the novel circuits and devices described herein may be embodied in a variety of other forms; furthermore, various omissions, substitutions and changes in the form of the circuits and devices described herein may be made without departing from the spirit of the inventions. The accompanying claims and their equivalents are intended to cover such forms or modifications as would fall within the scope and spirit of the inventions.

What is claimed is:

1. A division circuit comprising:
   an overflow determination circuit configured to determine whether or not a division result overflows by comparing absolute values of a dividend and a divisor;
   a replacement circuit configured to replace the dividend with a first value and replace the divisor with a second value when it is determined that the division result will overflow; and
   a stepwise division circuit configured to perform stepwise division on the dividend and the divisor or the first value and the second value.

2. The division circuit according to claim 1, further comprising a sign determination circuit configured to determine a sign of a quotient obtained as a result of the division from the dividend and the divisor, wherein the replacement circuit changes the first value according to the result of the determination of the sign of the quotient made by the sign determination circuit.

3. The division circuit according to claim 1, wherein the replacement circuit has:
   a first selection circuit configured to select and output one of the dividend and the first value according to the result of the determination made by the overflow determination circuit; and
   a second selection circuit configured to select and output one of the divisor and the second value according to the result of the determination made by the overflow determination circuit,
   wherein selection and output of the first value and selection and output of the second value respectively performed by the first selection circuit and the second selection circuit enable stepwise division using the first value as the dividend and using the second value as the divisor.

4. The division circuit according to claim 1, wherein the first value is stored in a first storage device, and the second value is stored in a second storage device.

5. The division circuit according to claim 4, wherein each of the first storage device and the second storage device is rewritable.

6. The division circuit according to claim 4, wherein the first storage device is capable of storing a plurality of the first values; the second storage device is capable of storing a plurality of the second values; and the replacement circuit replaces the dividend with a selected value out of the plurality of the first values and replaces the divisor with a selected value out of the plurality of the second values.

7. The division circuit according to claim 1, further comprising a zero determination circuit configured to determine whether or not the divisor is zero, wherein the replacement circuit replaces the dividend with the first value and replaces the divisor with the second value when the zero determination circuit determines that the divisor is zero.

8. The division circuit according to claim 1, wherein the first value and the second value are stored or overwritten in a register file.

9. A microprocessor comprising:
   an instruction decoder configured to decode a division instruction; and
   an arithmetic logic unit capable of executing stepwise division corresponding to the division instruction, the arithmetic logic unit having:
   an overflow determination circuit configured to determine whether or not a division result overflows by comparing absolute values of a dividend and a divisor;
   a replacement circuit configured to replace the dividend with a first value and replace the divisor with a second value when it is determined that the division result will overflow; and
   a stepwise division circuit configured to perform stepwise division on the dividend and the divisor or the first value and the second value.

10. The microprocessor according to claim 9, wherein the stepwise division circuit is an adder/subtractor.

11. The microprocessor according to claim 9, wherein the arithmetic logic unit has a sign determination circuit configured to determine a sign of a quotient obtained as a result of the division from the dividend and the divisor, and wherein the replacement circuit changes the first value according to the result of the determination of the sign of the quotient made by the sign determination circuit.

12. The microprocessor according to claim 9, wherein the replacement circuit has:
   a first selection circuit configured to select and output one of the dividend and the first value according to the result of the determination made by the overflow determination circuit; and
   a second selection circuit configured to select and output one of the divisor and the second value according to the result of the determination made by the overflow determination circuit, wherein selection and output of the first value and selection and output of the second value respectively performed by the first selection circuit and the second selection circuit enable stepwise division using the first value as the dividend and using the second value as the divisor.

13. The microprocessor according to claim 9, wherein the first value is stored in a first storage device, and the second value is stored in a second storage device.

14. The microprocessor according to claim 9, wherein each of the first storage device and the second storage device is rewritable.

15. The microprocessor according to claim 9, wherein the first storage device is capable of storing a plurality of the first values; the second storage device is capable of storing a plurality of the second values; and the replacement circuit replaces the dividend with a selected value out of the plurality of the first values and replaces the divisor with a selected value out of the plurality of the second values.

16. The microprocessor according to claim 9, wherein the arithmetic logic unit further has a zero determination circuit configured to determine whether or not the divisor is zero, and wherein the replacement circuit replaces the dividend with the first value and replaces the divisor with the second value when the zero determination circuit determines that the divisor is zero.

17. The microprocessor according to claim 9, wherein the first value and the second value are stored or overwritten in a register file.

* * * * *